W. A. MILLER.
ELECTRIC HEATER.
APPLICATION FILED JAN. 31, 1914.
1,137,513.  Patented Apr. 27, 1915.
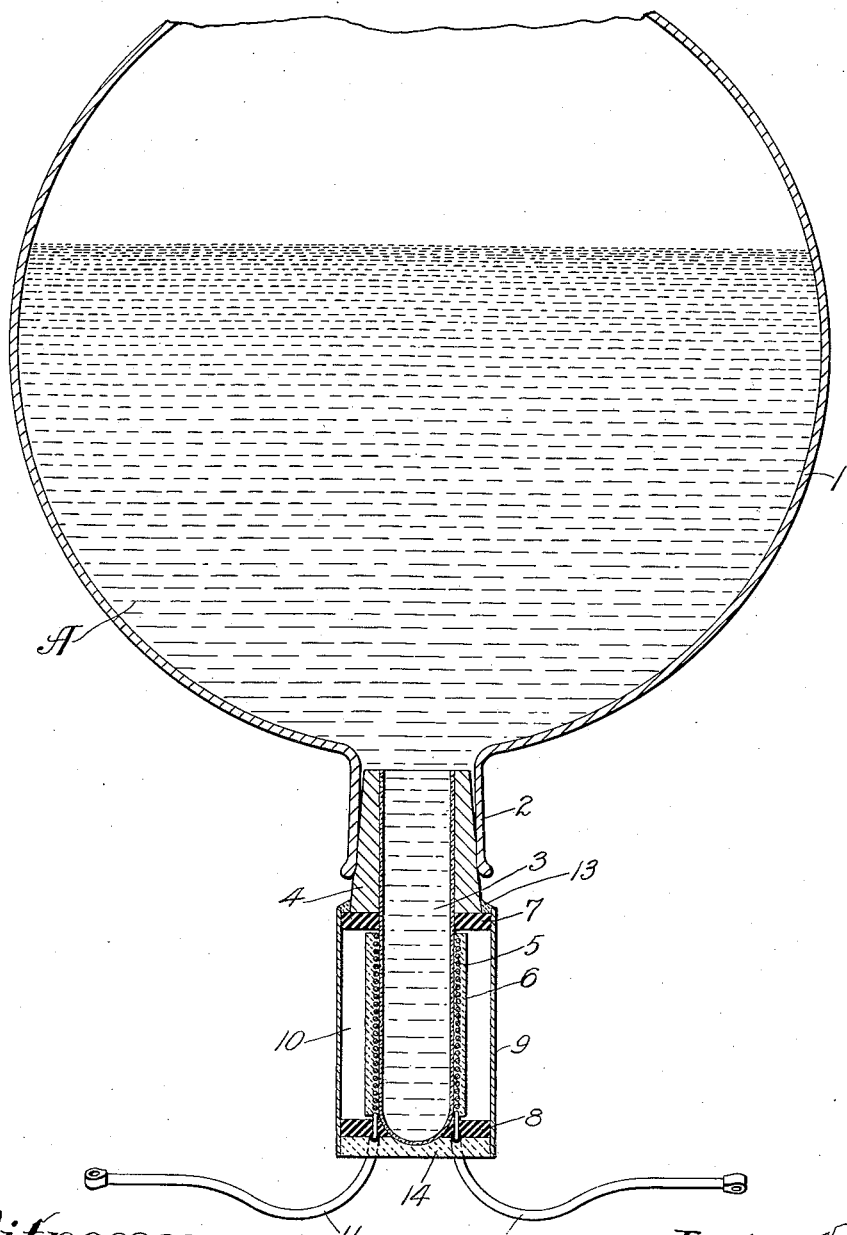

UNITED STATES PATENT OFFICE.

WILFRED A. MILLER, OF NEW YORK, N. Y.

ELECTRIC HEATER.

1,137,513.  Specification of Letters Patent.  Patented Apr. 27, 1915.

Application filed January 31, 1914. Serial No. 815,592.

*To all whom it may concern:*

Be it known that I, WILFRED A. MILLER, a citizen of the United States, residing at New York, in the county of New York and State of New York, have invented certain new and useful Improvements in Electric Heaters, of which the following is a specification, reference being had therein to the accompanying drawing.

My present invention relates to certain new and useful improvements in electric heaters intended chiefly for heating the liquid or fluid contents of a vessel as, for example, a coffee pot.

The object of the invention is to provide a cheap and efficient device of the kind mentioned which will consist of only a few parts and will do its work easily and quickly, besides being capable of easy attachment to and detachment from the object with which it is employed.

The invention, therefore, consists essentially in the construction, arrangement and combination of the various parts, substantially as will be hereinafter described and then more particularly pointed out in the claim.

In the accompanying drawing illustrating my invention, I have shown a single view in which the same is portrayed in section in operative relation to a vessel whose contents it is desired to heat.

1 denotes a spherical or globular body of a coffee pot or similar contrivance, the same being shown simply by way of illustration, whose contents, as shown at A, are coffee for example, it is desired to quickly and easily heat to the boiling point or otherwise. This body 1 is broken away at the top because the upper structure is immaterial. At the bottom it is provided with a central tubular projection or nozzle 2 which is designed to receive and hold one end of the electric heater by means of which the contents A are to be properly heated.

The heater is preferably made in a small simple compact form having a length of a few inches and a correspondingly small diameter. It comprises a glass tube 3, open at one end and closed at the other. Around the open end and extending for a portion of the length of the tube is a cork 4, or some other suitable yielding or partially elastic covering, which is secured to the glass tube and can be inserted with a tight fit into the tubular projection 2, as shown in the drawing. By such an insertion of the end of the heater into the body of the coffee pot or other vessel, the glass tube 3 is brought into communication with the interior of the body 1 so that the contents of the latter can readily fill the glass tube 3, all as shown in the drawing.

Immediately contiguous to the inner end of the cork 4 is a disk of insulating material, such as hard rubber 7, which surrounds the glass tube 3, and at a certain distance from said insulation 7, as for instance around the closed end of the glass tube 3, is another similar disk 8 of insulating material, the two disks 7 and 8 having preferably the same diameter. These insulating disks 7 and 8 are inclosed by a metallic tube 9, within which is an open space 10, through which passes a portion of the length of the glass tube 3. At one end of the metallic cylinder 9 close to the insulating disk 7, I fill in a cement ring 13 between the cork 4 and the end of the cylinder 9; further, the other end of the cylinder 9, between the insulation 8 and the outer periphery of the cylinder end, I fill in with cement, as shown at 14. The cement 13 and cement 14, make tight joints at the ends of the cylinder 9.

Within the space 10, the inner glass tube 3 is surrounded by a closely wound electric conductor 5, consisting of suitable wire. This wind or coil of wire is in close contact with the glass wall of the tube 3 and is kept in place during expansion and contraction and otherwise by means of a coating or covering of cement 6, or some other suitable material, which is placed thereon in the form of a cylindrical shell as indicated in the drawing, there being a free open space, as already stated, at 10 within the metallic cylinder 9 and around the cement 6. The ends of the conductor 5 connect through the insulation 8 with the external insulated conductors 11 and 12, which are adapted to be connected with sources of current so that when the current is turned on, the coil of wire 5 will be heated, and this heat will be imparted to the glass tube 3 and its contents and thereby to the contents of the flask or vessel 1, whereby the same will be heated to the proper temperature.

The passage of the current through the windings of the wire 5 obviously will heat the windings to a high temperature and will cause the heating effect to pass with greater or less intensity through the glass wall of the tube 3. In so heating the wire 5, it will naturally expand and contract and might become displaced in position upon the tube 3, if it were not for the cement covering 6 which I employ as one means of keeping the wire coil 5 in proper position.

Many changes may be made in the precise construction, arrangement, and combination of the various parts, without exceeding the scope of the invention as it is set forth and defined in the ensuing claim.

Having thus described my invention, what I claim as new and desire to secure by Letters Patent, is:—

In an electric heating attachment for vessels of various kinds, the combination with a glass tube closed at one end and open at the other, means surrounding the open end for enabling the latter to be inserted with tight fit into an opening in the vessel with which the device is used, insulating disks surrounding the glass tube at a certain distance apart, an outer cylindrical casing surrounding the said disks, and an electric conductor within said casing, said conductor being wound directly upon the glass, together with means for enabling an electric circuit to be passed through said conductor for heating the latter and imparting heat to the glass tube and its contents.

In testimony whereof I affix my signature in the presence of two witnesses.

WILFRED A. MILLER.

Witnesses:
 FRANK H. VICK, Jr.,
 ESTELLE M. BRYMAN.